Aug. 18, 1936.  L. A. LEHRMAN  2,051,610
TRUCK
Filed July 22, 1932   2 Sheets-Sheet 2
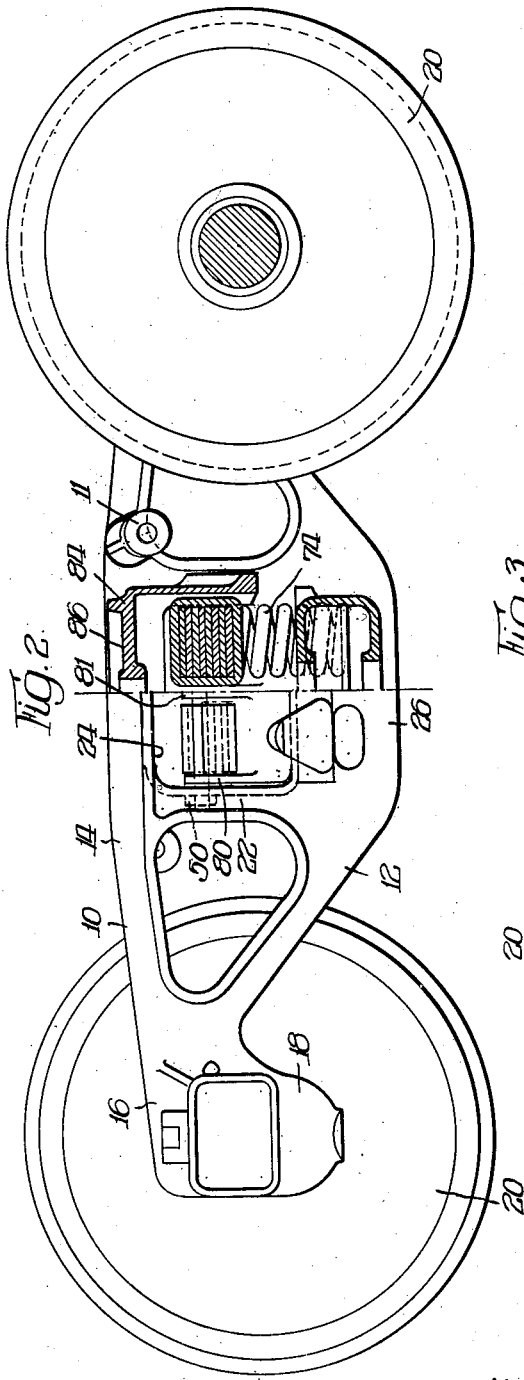
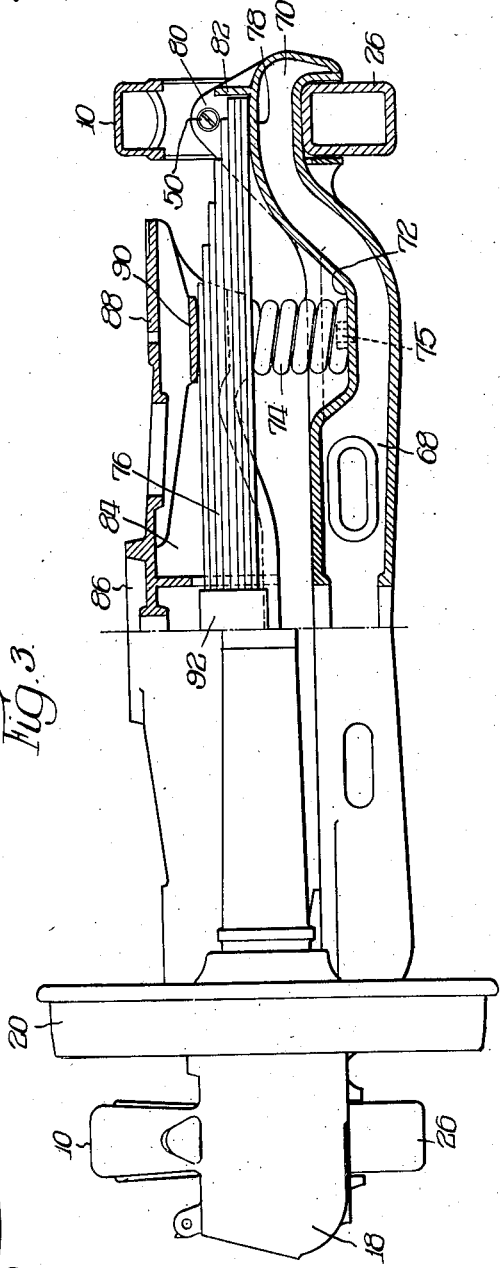
Inventor:
Leo A. Lehrman,
By Dickinson, Huxley, Byron & Knight
Attys.

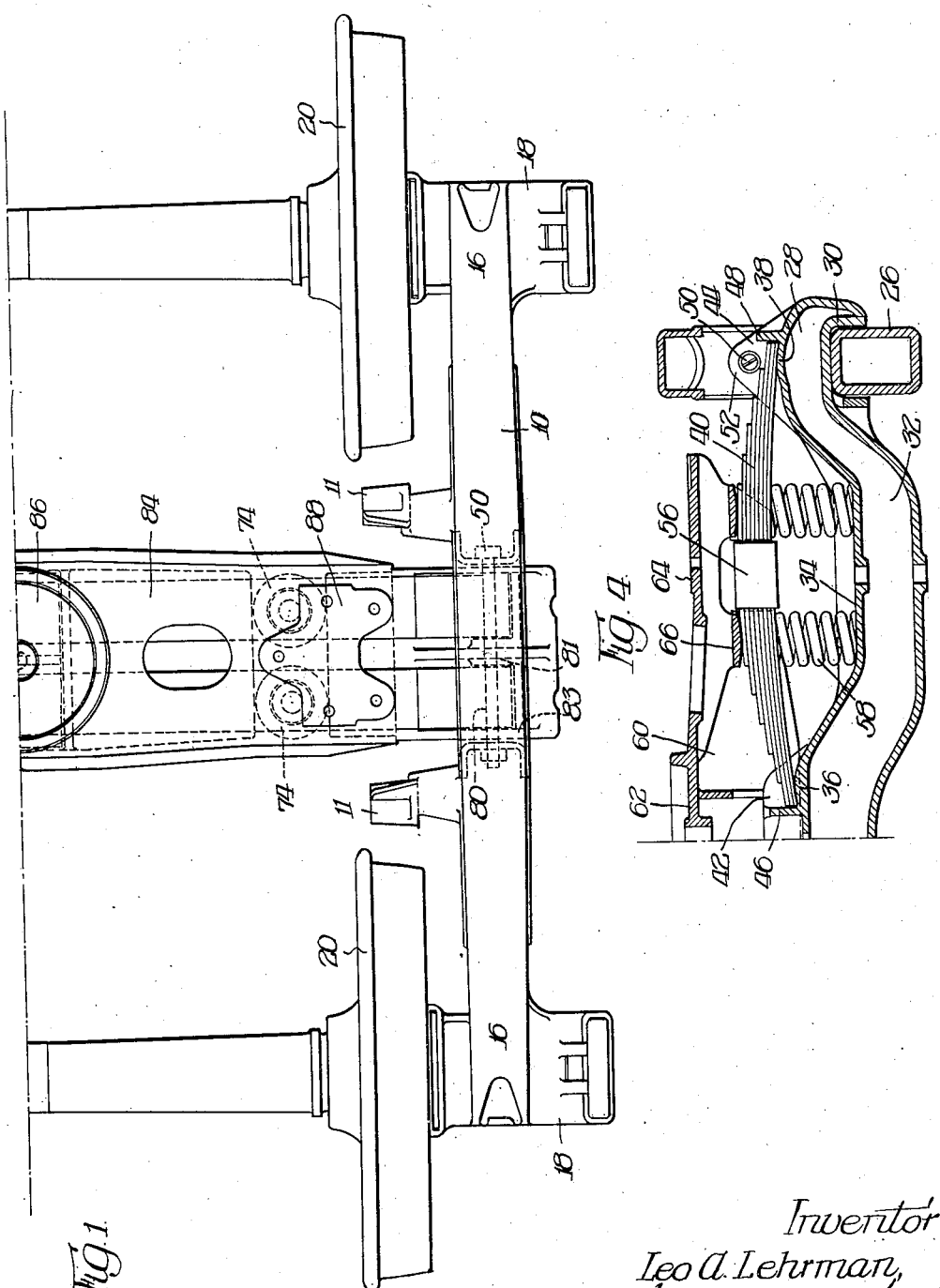

Patented Aug. 18, 1936

2,051,610

UNITED STATES PATENT OFFICE 2,051,610

TRUCK

Leo A. Lehrman, Chicago, Ill., assignor to American Steel Foundries, Chicago, Ill., a corporation of New Jersey Application July 22, 1932, Serial No. 624,006

26 Claims. (Cl. 105—197.1)

This invention pertains to truck construction, and more particularly to four-wheel trucks adapted particularly for high speed freight car use.

Desirable features for freight car trucks are economy, simplicity, lightness, strength and ease of maintenance, and these features are generally obtained within practical limitations on freight trucks now in use. However, present freight car trucks are very deficient in easy riding qualities since the spring suspension usually consists only of coil springs which strike a natural period of oscillation or vibration at some operating speed of the car. The resulting motion imparted to truck parts, car body and lading is violent and destructive and results in much damage to lading. Track or wheel irregularities, even if very slight, will set up this oscillation and when the frequency with which these irregularities are passed over agrees with the vibration period of the springs the motion amplifies and continues, due to the lack of dampening qualities in coil springs. The motion may amplify to the extent of causing derailment of the truck.

Efforts have been made to improve this condition by the use of frictional devices with the coil springs for the purpose of dampening the motion, but unless considerable friction is obtained they are not effective enough and if sufficient friction is obtained the spring action becomes too stiff and lacks sensitivity.

Passenger car trucks are generally easy riding, due to the use of both coil and elliptic leaf springs in series, the coil springs responding to the light, quick shocks, the leaf springs to the slow, heavy impulses. Coil springs are quick and sensitive in response, leaf springs relatively less so, partly due to frictional work absorption between the leaves. For this reason, and also by providing coil and leaf springs of different natural vibration periods, they tend to dampen each other's synchronous vibration without impairing free spring response.

Although the usual passenger car truck with series arrangement of coil and leaf springs gives good riding qualities, it is in general undesirably heavy, costly and complicated for freight service. This is particularly due to the complete duplication of carrying capacity in both coil and leaf springs.

It is therefore an object of this invention to provide a car truck which provides good riding qualities, and at the same time is economical to make and maintain, is simple and light in construction, and fulfills all requirements of manufacture and service.

Another object is to provide a car truck wherein springs of different character are arranged so that each tends to dampen out the vibrations of the other.

Still another object is to provide spring assemblies wherein there is provided softer cushioning action under light loads, while at the same time providing the necessary stiffness and capacity under heavy loads, these features being combined also to provide a structure which reduces any tendency toward synchronous vibration of the springs.

A further object is to provide a truck construction wherein a plurality of resilient members of different character are disposed with relation to each other so that certain of the members are loaded by the other members to increase the amount of energy they will absorb.

A yet further object is to provide a truck construction wherein the load carrying member is supported on the side frame by resilient members of different characteristics and so arranged that certain of the resilient members support a greater portion of the load than other of the resilient members.

A still different object is to provide a rigid truck construction embodying each or any of the above advantages and wherein brake supporting means is disposed to permit the application of the truck to cars adapted for use in dumping machines and the like.

A still further object is to provide a truck construction wherein resilient means of different character are provided, certain of said means being carried intermediate the side frames, and certain of the means being arranged transversely of the truck.

With these and various other objects in view the invention may consist of certain novel features of construction and operation as will be more fully described and particularly pointed out in the specification, drawings and claims appended hereto.

In the drawings, which illustrate embodiments of the device and wherein like reference characters are used to designate like parts—

Figure 1 is a fragmentary top plan view of a truck construction embodying the invention;

Figure 2 is a fragmentary sectional side elevation of the truck construction shown in Figure 1, the section being taken substantially in the plane of the longitudinal center line of the truck;

Figure 3 is a fragmentary sectional end elevation of the form of truck construction shown in Figures 1 and 2, the section being taken substantially in the transverse center line thereof;

Figure 4 is a transverse sectional elevation of a modified form of truck construction, the same being taken substantially in the plane of the transverse center line of said truck.

In the truck constructions shown, the side frame 10 is of substantially truss construction provided with brake hanger brackets, and includes the tension member 12 and the compression member 14, said members merging adjacent the ends thereof as at 16 and being provided with suitable journal cooperating means such as the journal box 18 having cooperative relation with the journal ends of the wheel and axle assemblies 20. The tension and compression members are provided with integral connecting columns 22 spaced to form the window 24, the portion 26 of the tension member between the columns forming a seat for the transverse spring plank or transom 28, shown particularly in Figure 4. The member 28 is provided with jaws 30 embracing the member 26, said member 28 being depressed as at 32 intermediate the longitudinal center line of the jaws to form a coil spring seat 34.

The raised portions adjacent the longitudinal center line and in the window are provided with arcuate seats 36 and 38 for accommodating the ends of the semi-elliptic leaf spring assembly 40. Pockets 42 and 44 are provided adjacent the seats 36 and 38, end walls 46 and 48 thereof serving as stops for the ends of the leaf spring assemblies. Suitable securing means, such as the bolt 50, is provided extending through the columns 22 and the spaced flanges 52 of the spring plank provided adjacent the seats 38. The semi-elliptic leaf spring is provided with the spring band 56, and coil springs 58 are disposed on the spring seat 34 and abut the underside of the leaf spring assembly 40 adjacent said spring band. The bolster 60 is provided with the center bearing 62 and the side bearings 64, said bolster having spaced seats 66 seating on the leaf spring assemblies 40, preferably in vertical alignment with the coil springs 58 whereby there is a pinching action between the leaves of the leaf spring assembly, thereby increasing the frictional absorption therebetween.

In the construction shown in Figures 1, 2 and 3, the spring plank 68 is provided with jaws 70 similar to the jaws 30 embracing the seat 26 of the side frame 10. In this case, however, the spring plank is depressed as at 72 inwardly of the side frame for the reception of a coil spring nest 74 positioned by a suitable dowel 75. A coil spring is disposed between the seat 72 and the semi-elliptic leaf spring assembly 76. The ends of the leaf spring 76 rest on seats 78 similar to seats 38 in the planes of the side frames. The seats 78 are defined by pockets 80 similar to pockets 44, being defined by flanges 81 and 83, the stop 82 similar to the stop 48 being provided, and suitable securing means 50 are also provided. In this case the bolster 84 is provided with the center bearing 86 and the side bearings 88, and a spring seat 90 is disposed substantially beneath the side bearing and preferably in vertical alignment with the coil spring nest 74 whereby increased frictional absorption is also obtained on the transversely arranged semi-elliptic leaf spring assembly 76, the assembly being provided with the spring band 92 disposed beneath the center bearing.

It is to be understood that I do not wish to be limited by the exact embodiments of the device shown, which are merely by way of illustration and not limitation, as various and other forms of the device will of course be apparent to those skilled in the art without departing from the spirit of the invention or the scope of the claims.

I claim:

1. In a truck, the combination of a side frame, a spring plank having seats thereon and cooperating with said side frame, a transversely arranged semi-elliptic leaf spring having the ends thereof supported on said seats, a load carrying member supported on said spring at spaced points, and coil springs interposed between said spring plank and leaf spring and disposed in alignment with the points of support of said load carrying member on said leaf spring.

2. In a truck, the combination of a side frame, a spring plank seated thereon and having a spring seat, a transversely arranged semi-elliptic leaf spring having an end thereof supported on said seat, a load carrying member supported on said spring, and a coil spring supporting said load carrying member on said side frame and disposed below the leaf spring and spaced from the center thereof and in vertical alignment with the point of support of said load carrying member and said leaf spring.

3. In a truck, the combination of a side frame, a spring plank having a seat thereon and cooperating with said side frame, a transversely arranged semi-elliptic leaf spring having an end thereof supported on said seat, a load carrying member supported on said spring, and a coil spring supporting said load carrying member on said spring plank and disposed below the leaf spring and spaced from the center thereof and in vertical alignment with the point of support of said load carrying member and said leaf spring.

4. A spring plank having spaced supports, a depressed portion between said supports, a seat disposed on each side of the transverse center line of said plank, said seats being adapted to accommodate the ends of a common leaf spring, and a seat disposed intermediate said first named seats and on said depressed portion below said first named seats.

5. A spring plank having space supports and a seat disposed on each side of the transverse center line thereof, said seats being adapted to accommodate the ends of a common leaf spring, and a coil spring seat disposed between said other seats and below the same.

6. In a truck, the combination of spaced side frames each having tension and compression members and connecting columns forming a window therewith, each tension member between said columns forming a seat, a connecting member disposed between said side frames and having jaws defining seat portions, said jaws being adapted to embrace said seats, whereby said seat portions are carried by said seats, leaf spring seats disposed on said connecting member substantially in the plane of said side frames, a semi-elliptic leaf spring having the ends thereof supported on said leaf spring seats, a load carrying member having spaced seats engaging said leaf spring whereby said load carrying member is supported on said leaf spring, said connecting member having coil spring seats in substantially vertical alignment with the seats on said load carrying member, and coil springs carried by said coil spring seats and disposed in supporting engagement with said leaf spring.

7. In a truck, the combination of spaced side frames each having tension and compression members and connecting columns forming a window therewith, each tension member between said columns forming a seat, a connecting member disposed between said side frames and having jaws defining seat portions, said jaws being adapted to embrace said seats, whereby said seat portions are carried by said seats, means securing said connecting member to said columns, leaf spring seats disposed on said connecting member substantially in the plane of said side frames, a semi-elliptic leaf spring having the ends thereof supported on said leaf spring seats, a load carrying member having spaced seats engaging said leaf spring whereby said load carrying member is supported on said leaf spring, said connecting member having coil spring seats in substantially vertical alignment with the seats on said load carrying member, and coil springs carried by said coil spring seats and disposed in supporting engagement with said leaf spring.

8. In a truck, the combination of spaced side frames each having tension and compression members and connecting columns forming a window therewith, each tension member between said columns forming a seat, a connecting member disposed between said side frames and having jaws defining seat portions, said jaws being adapted to embrace said seats, whereby said seat portions are carried by said seats, leaf spring seats disposed on said connecting member substantially in the planes of said side frames, end thrust members adjacent said leaf spring seats, a semi-elliptic leaf spring having the ends thereof supported on said leaf spring seats, a load carrying member having spaced seats engaging said leaf spring whereby said load carrying member is supported on said leaf spring, said connecting member having coil spring seats in substantially vertical alignment with the seats on said load carrying member, and coil springs carried by said coil spring seats and disposed in supporting engagement with said leaf spring.

9. In a truck, the combination of spaced side frames each having tension and compression members and connecting columns forming a window therewith, each tension member between said columns forming a seat, a connecting member disposed between said side frames and having jaws defining seat portions, said jaws being adapted to embrace said seats, whereby said seat portions are carried by said seats, leaf spring seats disposed on said connecting member substantially in the plane of said side frames, leaf spring seats disposed on said connecting member intermediate the ends thereof, semi-elliptic leaf springs each having one end thereof disposed on said first named leaf spring seats and the other end thereof disposed on the second named leaf spring seats, a load carrying member having spaced seats engaging said leaf springs at spaced points whereby said load carrying member is supported on said leaf spring, said connecting member having coil spring seats in substantially vertical alignment with the seats on said load carrying member, and coil springs carried by said coil spring seats and disposed in supporting engagement with said leaf springs.

10. In a truck, the combination of spaced side frames each having tension and compression members and connecting columns forming a window therewith, each tension member between said columns forming a seat, a connecting member disposed between said side frames and having jaws defining seat portions, said jaws being adapted to embrace said seats, whereby said seat portions are carried by said seats, leaf spring seats disposed on said connecting member substantially in the plane of said side frames, a semi-elliptic leaf spring having the ends thereof supported on said leaf spring seats, a bolster having spaced seats engaging said leaf spring whereby said bolster is supported on said leaf spring, said connecting member having coil spring seats in substantially vertical alignment with the seats on said bolster, and coil springs carried by said coil spring seats and disposed in supporting engagement with said leaf spring.

11. In a truck, the combination of spaced side frames each having tension and compression members and connecting columns forming a window therewith, each tension member between said columns forming a seat, a connecting member disposed between said side frames and having jaws defining seat portions, said jaws being adapted to embrace said seats, whereby said seat portions are carried by said seats, leaf spring seats disposed on said connecting member substantially in the plane of said side frames, leaf spring seats disposed on said connecting member intermediate the ends thereof, semi-elliptic leaf springs each having one end thereof disposed on said first named leaf spring seats and the other end thereof disposed on the second named leaf spring seats, a bolster having spaced seats engaging said leaf springs at spaced points whereby said bolster is supported on said leaf spring, said connecting member having coil spring seats in substantially vertical alignment with the seats on said bolster, and coil springs carried by said coil spring seats and disposed in supporting engagement with said leaf springs.

12. In a truck, the combination of spaced side frames each having tension and compression members and connecting columns forming a window therewith, each tension member between said columns forming a seat, a connecting member disposed between said side frames and having jaws defining seat portions, said jaws being adapted to embrace said seats, whereby said seat portions are carried by said seats, leaf spring seats disposed on said connecting member substantially in the plane of said side frames, leaf spring seats disposed on said connecting member intermediate the ends thereof, end thrust members adjacent each of said leaf spring seats, semi-elliptic leaf springs each having one end thereof disposed on said first named leaf spring seats and the other end thereof disposed on the second named leaf spring seats, a load carrying member having spaced seats engaging said leaf springs at spaced points whereby said load carrying member is supported on said leaf spring, said connecting member having coil spring seats in substantially vertical alignment with the seats on said load carrying member, and coil springs carried by said coil spring seats and disposed in supporting engagement with said leaf springs.

13. In a truck, the combination of spaced side frames each having tension and compression members and connecting columns forming a window therewith, each tension member between said columns forming a seat, a connecting member disposed between said side frames and having jaws defining seat portions, said jaws being adapted to embrace said seats, whereby said seat portions are carried by said seats, leaf spring seats disposed on said connecting member substantially in the plane of said side frames, a semi-elliptic leaf spring having the ends thereof supported on said leaf spring seats, a load carrying member having spaced seats engaging said leaf spring whereby said load carrying member is supported on said leaf spring, said connecting member having coil spring seats, and coil springs carried by said coil spring seats for supporting said load carrying member.

14. In a truck, the combination of spaced side frames each having tension and compression members and connecting columns forming a window therewith, each tension member between said columns forming a seat, a connecting member disposed between said side frames and having jaws defining seat portions, said jaws being adapted to embrace said seats, whereby said seat portions are carried by said seats, leaf spring seats disposed on said connecting member substantially in the plane of said side frames, leaf spring seats disposed on said connecting member intermediate the ends thereof, semi-elliptic leaf springs each having one end thereof disposed on said first named leaf spring seats and the other end thereof disposed on the second named leaf spring seats, a load carrying member having spaced seats engaging said leaf springs at spaced points whereby said load carrying member is supported on said leaf spring, said connecting member having coil spring seats, and coil springs carried by said coil spring seats for supporting said load carrying member.

15. In a truck, the combination of spaced side frames each having tension and compression members and connecting columns forming a window therewith, each tension member between said columns forming a seat, a connecting member disposed between said side frames and having jaws defining seat portions, said jaws being adapted to embrace said seats, whereby said seat portions are carried by said seats, leaf spring seats disposed on said connecting member substantially in the plane of said side frames, a semi-elliptic leaf spring having the ends thereof supported on said leaf spring seats, a load carrying member having spaced seats engaging said leaf spring whereby said load carrying member is supported on said leaf spring, and coil springs for supporting said load carrying member.

16. In a truck, the combination of spaced side frames each having tension and compression members and connecting columns forming a window therewith, each tension member between said columns forming a seat, a connecting member disposed between said side frames and having jaws defining seat portions, said jaws being adapted to embrace said seats, whereby said seat portions are carried by said seats, leaf spring seats disposed on said connecting member substantially in the plane of said side frames, leaf spring seats disposed on said connecting member intermediate the ends thereof, semi-elliptic leaf springs each having one end thereof disposed on said first named leaf spring seats and the other end thereof disposed on the second named leaf spring seats, a load carrying member having spaced seats engaging said leaf springs at spaced points whereby said load carrying member is supported on said leaf spring, and coil springs for supporting said load carrying member.

17. In a truck, the combination of a side frame, a spring plank seated on said side frame, a semi-elliptic leaf spring supported on said spring plank at a plurality of points, and a load carrying member supported on said leaf spring at a plurality of points and having center and side bearings, said side bearing being disposed adjacent said plurality of points.

18. In a truck, the combination of a side frame, a spring plank seated on said side frame, a leaf spring supported on said spring plank at a plurality of points, and a load carrying member supported on said leaf spring at a plurality of points intermediate said first named points and longitudinally of said spring, said load carrying member having center and side bearings, said side bearing being disposed adjacent said plurality of points.

19. In a truck, the combination of a side frame, a spring plank seated on said side frame, a leaf spring engaging said spring plank at a plurality of points longitudinally of said spring, a load carrying member supported on said leaf spring at a plurality of points, and coil springs interposed between said spring plank and leaf spring in substantially vertical alignment with said second named points.

20. In a truck, the combination of a side frame, a spring plank seated on said side frame, a leaf spring supported on said spring plank at a plurality of points, a load carrying member supported on said leaf spring at a plurality of points intermediate said first named points, and coil springs interposed between said spring plank and leaf spring in substantially vertical alignment with said second named points.

21. In a truck, the combination of a side frame, a spring plank seated on said side frame, a leaf spring engaging said spring plank at a plurality of points longitudinally of said spring, a load carrying member supported on said leaf spring at a plurality of points, and coil springs interposed between said spring plank and leaf spring in substantially vertical alignment with certain of said plurality of points.

22. In a truck, the combination of a side frame, a spring plank seated on said side frame, a leaf spring supported on said spring plank at a plurality of points, a load carrying member supported on said leaf spring at a plurality of points intermediate said first named points, and coil springs interposed between said spring plank and leaf spring in substantially vertical alignment with certain of said plurality of points.

23. In a bolster, the combination of a body portion including an upper member having center and side bearings thereon, depending side members, and spaced substantially horizontally aligned leaf spring seats disposed on each side of said center bearing and within the substantially U-section formed by said upper and side members.

24. In a bolster, the combination of a body portion including an upper member having center and side bearings thereon, depending side members, and spaced spring seats disposed on each side of said center bearing and within the substantially U-section formed by said upper and side members, one of each of said spaced seats being in substantially vertical alignment with each of said side bearings, the others of said spring seats being between said center and side bearings, said spaced seats being in substantially horizontal alignment.

25. A spring plank having spaced supports, a pair of spaced seats disposed on each side of the transverse center line of said plank, one of each pair of seats being in substantially vertical alignment with said supports, each of said seats being adapted to accommodate the ends of a leaf spring, and a spring seat on said spring plank disposed between each of the pairs of said first named seats for accommodating a spring of different form than the spring for said first named seats.

26. A spring plank having spaced supports, a pair of spaced seats disposed on each side of the transverse center line of said plank and above the major portion thereof, one of each pair of seats being in substantially vertical alignment with said supports, each of said seats being adapted to accommodate the ends of a leaf spring, and a spring seat for a coil spring on said spring plank disposed between each of the pairs of said first named seats.

LEO A. LEHRMAN.